(12) United States Patent
Suetsugu et al.

(10) Patent No.: US 12,391,601 B2
(45) Date of Patent: Aug. 19, 2025

(54) GLASS MATERIAL THAT TRANSMITS LIGHT BEAMS HAVING WAVELENGTH RANGE FROM VISIBLE LIGHT TO FAR INFRARED LIGHT

(71) Applicant: ISUZU GLASS LTD., Izumisano (JP)

(72) Inventors: Tatsuya Suetsugu, Izumisano (JP); Kazuhiro Nakano, Izumisano (JP); Noriyoshi Higashi, Izumisano (JP); Takao Yamaguro, Izumisano (JP)

(73) Assignee: ISUZU GLASS LTD, Osaka (JP)

( * ) Notice: Subject to any disclaimer, the term of this patent is extended or adjusted under 35 U.S.C. 154(b) by 1000 days.

(21) Appl. No.: 17/425,419

(22) PCT Filed: Jan. 23, 2020

(86) PCT No.: PCT/JP2020/002355
§ 371 (c)(1),
(2) Date: Jul. 23, 2021

(87) PCT Pub. No.: WO2020/153435
PCT Pub. Date: Jul. 30, 2020

(65) Prior Publication Data
US 2022/0185723 A1 Jun. 16, 2022

(30) Foreign Application Priority Data

Jan. 25, 2019 (JP) .................. 2019-011091

(51) Int. Cl.
*C03C 3/32* (2006.01)
*C03C 4/10* (2006.01)
*G02B 3/04* (2006.01)

(52) U.S. Cl.
CPC ............... *C03C 3/323* (2013.01); *C03C 4/10* (2013.01); *G02B 3/04* (2013.01)

(58) Field of Classification Search
CPC ........... C03C 3/321; C03C 3/323; C03C 4/10; C03C 3/32
See application file for complete search history.

(56) References Cited

U.S. PATENT DOCUMENTS 5,392,376 A * 2/1995 Aitken .................. C03C 13/044
501/40
5,599,751 A * 2/1997 Harbison .............. C03C 13/043
501/40

(Continued)

FOREIGN PATENT DOCUMENTS

JP 5-4824 A 1/1993
JP 5-85769 A 4/1993

(Continued)

OTHER PUBLICATIONS

Masselin. CsCl effect on the optical properties of the 80GeS2—20Ga2S3 base glass. Appl Phys. A (2012) 106:697-702 (Year: 2012).*

(Continued)

*Primary Examiner* — Matthew E. Hoban
(74) *Attorney, Agent, or Firm* — WHDA, LLP

(57) ABSTRACT

The main object or purpose of the present invention is to provide a glass material that is suitable for mold forming, can reduce the size, and allows rays having a wavelength region between visible light to far-infrared light to pass through. To overcome this object, the present invention provides a glass material allowing rays having a wavelength in the region from visible light to far-infrared light to pass through,
the glass material comprising, in terms of molar concentration:
50 to 70% of S,
15 to 30% of Ge,
5 to 20% of Ga, (Continued)

0.5 to 15% of Ba, and 3 to 15% of at least one member selected from the group consisting of Cl, Br, and I, with the proviso that when the Cl is present alone, the molar concentration is 6 to 15%.

5 Claims, 2 Drawing Sheets

(56) References Cited

U.S. PATENT DOCUMENTS

| | | | |
|---|---|---|---|
| 2006/0257097 A1 | 11/2006 | Aitken et al. | |
| 2010/0285946 A1 | 11/2010 | Tani et al. | |
| 2013/0278999 A1* | 10/2013 | Carlie | C03C 3/32 359/356 |
| 2018/0099898 A1 | 4/2018 | Kadono et al. | |

FOREIGN PATENT DOCUMENTS

| | | |
|---|---|---|
| JP | 6-92654 A | 4/1994 |
| JP | 7-300338 A | 11/1995 |
| JP | 2006-76845 A | 3/2006 |
| JP | 2006-290738 A | 10/2006 |
| JP | 5339720 B2 | 11/2013 |
| WO | 2016/159289 A1 | 10/2016 |

OTHER PUBLICATIONS

Extended (Supplementary) European Search Report dated Sep. 27, 2022, issued in counterpart EP application No. 20745536.1. (8 pages).

Pascal Masselin et al.: "CsCl effect on the optical properties of the 80GeS2-20Ga2S3 base glass", Applied Physics A, vol. 106, No. 3, Mar. 1, 2021, pp. 697-702. (6 pages) cited in EESR dated Sep. 27, 2022.

International Search Report dated Apr. 7, 2020, issued in counterpart International Application No. PCT/JP2020/002355. (2 pages).

Ledemi et al., "Structural Investigations of Glass Ceramics in the Ga2S3—GeS2—CsCl System", J. Phys. Chem. B, (2009), vol. 113, No. 44, pp. 14574-14580, Cited in Specification. (7 pages).

Brehault et al., "Influence of NaX (X=I or Cl) additions on GeS2—Ga2S3 based glasses", Journal of Solid State Chemistry, (2014), vol. 220, pp. 238-244, Cited in Specification. (8 pages).

Person et al., "Synthesis and characterization of GeS2—Ga2S3—MCl2 (M=Ba, Cd) chalcohalide glasses", Solid State Sciences, (2005), vol. 7, pp. 303-309, Cited in Specification. (4 pages).

\* cited by examiner

GLASS MATERIAL THAT TRANSMITS LIGHT BEAMS HAVING WAVELENGTH RANGE FROM VISIBLE LIGHT TO FAR INFRARED LIGHT

TECHNICAL FIELD

The present invention relates to a glass material that allows rays having a wavelength region between visible light to far-infrared light to pass through.

BACKGROUND ART

Sensors used in crime prevention devices and authorization devices mainly use optical elements. The optical elements used in the sensors comprise infrared-transmitting materials that allow infrared rays to pass through. These devices have recently been increasingly required to have high performance, a small size, and high versatility, due to, for example, the heightened awareness of security, safety, etc., and social needs. Therefore, it is also necessary to reduce the size of sensors used in these devices. Optical elements that exhibit infrared-transmitting performance and that are used for the sensors are required to have high performance and a small size, and high productivity is required for the production process of optical elements.

Examples of materials of optical elements having infrared-transmitting performance include germanium and zinc selenide. However, because they are crystals, the processing means of these materials is limited to polish forming. Therefore, it is extremely difficult to mass-produce optical elements having a complicated shape, such as lens arrays, using these crystal materials. In particular, producing sensors using germanium as a material is not highly versatile because germanium is an expensive material.

In contrast, examples of infrared-transmitting materials that are aimed to improve the productivity of the above sensors and that are not crystals include chalcogenide glass comprising elements such as S, Se, or Te as main components. Chalcogenide glass is, for example, disclosed in Patent Literature 1 to 7.

PTL 1 discloses the production of optical elements by a method of molding plastics using chalcogenide glass as a raw material, and a glass composition suitable for the production.

Although PTL 2 and 3 disclose specific chalcogenide glass compositions, these documents do not disclose specific glass compositions suitable for highly productive mold forming.

PTL 4 and 5 disclose a method of mold forming chalcogenide glass. However, PTL 4 and 5 do not disclose the specific compositions of chalcogenide glass, and glass compositions that are difficult for mold forming are included. Thus, further discussion is required for improving formability.

PTL 6 discloses an "infrared-transmitting glass for mold forming, the glass comprising, in terms of molar concentration, 2 to 22% of Ge, 6 to 34% of at least one element selected from the group consisting of Sb and Bi, 1 to 20% of Sn, and 58 to 70% of at least one element selected from the group consisting of S, Se and Te." However, the transmission range of the glass disclosed in PTL 6 is limited to rays in the infrared region, such as 3 to 5 μm and 8 to 12 μm, which are called "atmospheric windows".

PTL 7 discloses infrared-transmitting glass suitable for mold forming, comprising, in terms of molar concentration, 0 to 2% of Ge, 3 to 30% of Ga, 10 to 40% of Sb, 45 to 70% of S, 3 to 30% of at least one member selected from the group consisting of Sn, Ag, Cu, Te, and Cs, and 0 to 30% of at least one member selected from the group consisting of Cl, Br, and I. However, the glass disclosed in PTL 7 only allows rays in the range from the part of the visible region (about 600 nm) to the infrared region to pass through.

NPL 1 and 2 only disclose Ge—Ga—S—CsX glass, but do not disclose the addition of other components to this glass, and the effects obtained thereby.

NPL 3 discloses $GeS_2$—$Ga_2$—$S_3$-$MCl_2$ (M is Ba or Cd) cargogenide glass, wherein the glass comprises 3 to 5.7% of Cl in terms of molar concentration; however, it does not disclose the wavelength of rays that can pass through the glass. NPL 3 merely discloses that the band cap wavelength of the glass is around 460 to 500 nm.

CITATION LIST

Patent Literature

PTL 1: JP2006-290738A
PTL 2: JP2006-076845A
PTL 3: JP1993-085769A
PTL 4: JP1994-092654A
PTL 5: JP1993-004824A
PTL 6: U.S. Pat. No. 5,339,720
PTL 7: WO2016/159289

Non-Patent Literature

NPL 1: J. Phys. Chem. B 113 (2009) pp. 14574-14580
NPL 2: Journal of Solid State Chemistry 220 (2014) pp. 238-244
NPL 3: Solid State Science 7 (2005) 303-309

SUMMARY OF INVENTION

Technical Problem

Chalcogenide glass, whose development has been currently promoted, and which is for use in crime prevention devices and authentication devices, which is easily processed into sensors, and which is suitable for mold forming only allows rays in the range from the part of the visible region to the infrared region to pass through.

This means that, to produce optical elements that allow rays having a wider range of wavelengths to pass through, it is necessary to combine optical elements exhibiting several different types of transmitting properties, which fails to meet the recent social demands for smaller devices.

Accordingly, the main object or purpose of the present invention is to provide a glass material that is suitable for mold forming, can reduce the size, and that allows rays having a wavelength region between visible light to far-infrared light to pass through.

Solution to Problem

The present inventors conducted extensive research to achieve the above object, and consequently found that the above object can be achieved by chalcogenide glass having a composition of a specific molar ratio. The present invention has been completed based on the above finding and broadly includes the following embodiments.

Item 1

A glass material allowing rays having a wavelength in the region from visible light to far-infrared light to pass through, the glass material comprising, in terms of molar concentration:
  50 to 70% of S,
  15 to 30% of Ge,
  5 to 20% of Ga,
  0.5 to 15% of Ba, and
  3 to 15% of at least one member selected from the group consisting of Cl, Br, and I, with the proviso that when the Cl is present alone, its molar concentration is 6 to 15%.

Item 2

The glass material according to Item 1, further comprising, in terms of molar concentration, more than 0% to 15% or less of Rb and/or Cs.

Item 3

The glass material according to Item 1 or 2, wherein the rays have a wavelength in the range of 420 nm to 12 µm.

Item 4

The glass material according to any one of Items 1 to 3, wherein the glass transition temperature (Tg) is 320° C. or more.

Item 5 The glass material according to any one of Items 1 to 4, wherein the difference (ΔT value) between the crystallization temperature (Tc) and the glass transition temperature (Tg) is 120 K or more.

Item 6

The glass material according to any one of Items 1 to 5 for use in producing a spherical lens, an aspheric lens, a lens array, a microlens array, or a diffraction grating by mold forming.

Advantageous Effects of Invention

Since the glass material of the present invention can allow rays having a wavelength in a very wide range from visible light to far infrared light, i.e., a wavelength in the range of 420 nm to 12 µm, the glass material of the present invention alone can allow rays in a sufficient range of visible and infrared regions without combining several types of glass having different transmitting properties. Specifically, by using only the glass material of the present invention, the size of sensors used in crime prevention devices and authentication devices can be reduced.

Since the glass material of the present invention is an amorphous chalcogenide glass, it is suitable for molding unlike crystallized glass, and optical elements of complicated shapes, such as a spherical lens, an aspherical lens, or a lens array can be easily produced.

DESCRIPTION OF EMBODIMENTS

Figure 1:
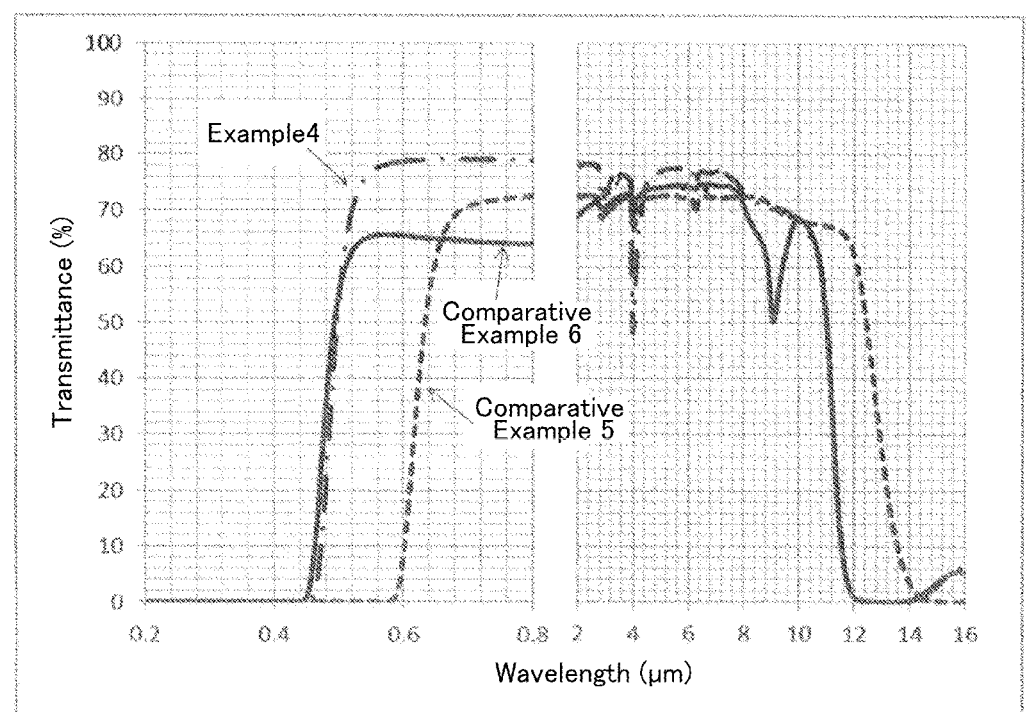
FIG. 1 shows the transmission spectra of Example 4 (single-dotted line), Comparative Example 5 (dashed line), and Comparative Example 6 (solid line).

The infrared-transmitting glass of the present invention is explained below.

The description "A to B" in the present specification means A or more to B or less.

The glass material of the present invention allows rays having a wavelength in the region from visible light to far-infrared light to pass through, and the glass material comprises, in terms of molar concentration:
  50 to 70% of S,
  15 to 30% of Ge,
  5 to 20% of Ga,
  0.5 to 15% of Ba, and
  3 to 15% of at least one member selected from the group consisting of Cl, Br, and I, with the proviso that when the Cl is present alone, the molar concentration is 6 to 15%.

The glass material of the present invention having the above composition can allow rays having a very wide range of wavelengths in the infrared region to pass through. Further, the glass material of the present invention is suitable for mold forming because it is an amorphous chalcogenide glass, which is not a crystal. Optical elements having a complicated shape, such as aspherical lenses and lens arrays, can be easily produced.

Each component of the glass material of the present invention is described below together with the contents. In a multicomponent glass material, the components affect each other to determine the peculiar characteristics of the glass material. It is thus not necessarily appropriate to discuss the quantitative range of each element component depending on the characteristics of each component; however, the base of specifying the quantitative range of each element component of the glass material of the present invention is described below.

The glass material of the present invention comprises, in terms of molar concentration (=content):
  50 to 70% of S,
  15 to 30% of Ge,
  5 to 20% of Ga,
  0.5 to 15% of Ba, and
  3 to 15% of at least one member selected from the group consisting of Cl, Br, and I.

S is an element that forms the skeletal structure of the glass material of the present invention. The S content in the glass material of the present invention is 50 to 70%, preferably about 52 to 68%, and more preferably about 55 to 65%, in terms of molar concentration. The specific lower limit is 52.8% or more, or 53.4% or more, and the upper limit is 58.1% or less, 58.6% or less, 61.1% or less, or 61.7% or less, in terms of molar concentration. If the S content is less than 50% or more than 70%, the mold formability of the glass material of the present invention may be reduced.

Ge is an element that forms the network structure of the glass material of the present invention. The Ge content in the glass material of the present invention is 15 to 30%, preferably about 17 to 28%, and more preferably about 20 to 25%, in terms of molar concentration. The specific lower limit is 15.1% or more, 15.3% or more, 19.5% or more, or 19.8% or more, and the upper limit is 21.2% or less, or 24.3% or less, in terms of molar concentration. If the Ge content is less than 15% or more than 30%, the glass material of the present invention may be easily crystallized.

Ga is an element that forms the network structure of the glass material of the present invention. The Ga content in the glass material of the present invention is 5 to 20%, preferably about 6 to 18%, and more preferably about 8 to 15%, in terms of molar concentration. The specific lower limit is 8.8% or more, 9.0% or more, 12.4% or more, 12.5% or more, or 12.6% or more, and the upper limit is 15.1% or less, or 15.3% or less, in terms of molar concentration. If the Ga content is less than 5% or more than 20%, the glass material of the present invention may be easily crystallized.

Ba is an element that can improve the glass formation and the thermal stability of the glass material of the present invention. Ba is also an element that can provide the glass material of the present invention with the effect of allowing rays with short wavelengths to pass through. The Ba content in the glass material of the present invention is 0.5 to 15%, preferably about 0.5 to 12%, and more preferably about 0.5 to 10%, in terms of molar concentration. The specific lower limit thereof is 0.8% or more, 1.6% or more, 1.7% or more, 1.8% or more, or 1.9% or more, and the upper limit is 2.5% or less or 3.5% or less, in terms of molar concentration. If the Ba content is less than 0.5% or more than 15%, in terms of concentration, the glass material of the present invention may be easily crystallized.

Cl, Br, and I, which are halogens, are elements that can provide the glass material of the present invention with the effect of allowing rays with short wavelengths to pass through. The content of at least one member selected from the group consisting of Cl, Br, and I in the glass material of the present invention is 3 to 15%, preferably about 3 to 12%, and more preferably about 3 to 10%, in terms of molar concentration. The specific lower limit is 3.4% or more, 3.5% or more, 5.4% or more, or 7.1% or more, and the upper limit is 9.4% or less, in terms of molar concentration.

If the halogen contained in the glass material of the present invention is Cl alone, the Cl content is not the content of halogen in terms of molar concentration defined as above, and it is 6 to 15% in terms of molar concentration. The specific lower limit is 6.1% or more and the upper limit is 8.3% or less, in terms of molar concentration.

If the content of at least one member selected from the group consisting of Cl, Br, and I described above is less than 3%, in terms of molar concentration, the glass material of the present invention may easily crystallize, and if the content exceeds 15%, the resistance of the glass material of the present invention to moisture may be adversely affected.

Rb and/or Cs can be optionally added to the glass material of the present invention. Rb and Cs are elements that can further improve the glass-forming properties and thermal stability of the glass material of the present invention. Rb and/or Cs are also elements that can provide the glass material of the present invention with the effect of allowing rays having short wavelengths to pass through. Specifically, by adding Rb and/or Cs to the glass material of the present invention, more excellent infrared-transmitting glass can be produced.

The Rb and/or Cs content in the glass material of the present invention is not particularly limited as long as the effect of the present invention is attained. Specifically, the Rb and/or Cs content exceeds 0% to about 15% or less, preferably about 1 to 12%, more preferably about 1 to 10%, and the most preferably about 1 to 7%, in terms of molar concentration. The specific lower limit is 1.1% or more, or 1.8% or more, and the upper limit is 6.9% or less, or 5.7% or less, in terms of molar concentration.

The glass material of the present invention may contain Sb, Ta, W, In, Bi, etc., as required, in addition to the above components. The content (total amount) of these components is not limited as long as the effect of the present invention is attained. Specifically, the content of these components is preferably 0 to 10%, and more preferably 1 to 5%, in terms of molar concentration. Although the reason for the addition of these elements is not limited, these elements are added, for example, for the purpose of facilitating the formation of glass.

The glass material of the present invention can be produced by suitably combining the content of each component.

The glass material of the present invention allows rays having a wavelength region from visible light to far-infrared light to pass through. More specifically, the glass material of the present invention allows rays having a wavelength of 420 nm to 12 µm. Accordingly, the glass material of the present invention allows rays having a wavelength of 3 to 5 µm and 8 to 12 µm, which are called "atmospheric windows," to pass through. The glass material of the present invention generally allows most of rays having a wavelength in the range of 360 nm to 750 nm, which is defined as visible rays, to pass through.

The glass transition temperature (Tg) of the glass material of the present invention is not particularly limited as long as the effect of the present invention is attained. The specific glass transition temperature (Tg) can be about 320° C. or more, which is an appropriate temperature for mold forming. The Tg of the glass material of the present invention is preferably about 350° C. or more, more preferably 370° C. or more, and most preferably 390° C. or more.

The temperature (Tc) at which the glass material of the present invention crystallizes is not particularly limited as long as the effect of the present invention is attained. The specific temperature (Tc) at which crystallization occurs can be about 510° C. or more, and preferably about 530° C. or more, in view of the fact that the material easily becomes glass.

The ΔT value (the difference between the crystallization temperature (Tc) and the glass transition temperature (Tg)) that indicates the thermal stability of the glass material of the present invention is not particularly limited as long as the effect of the present invention is attained. The specific ΔT value of the glass material of the present invention can be about 120 K or more.

A larger value of ΔT indicates that the glass material has higher thermal stability and superior mold formability. When ΔT is 150 K or more, it can be said that mold formability is very high.

The method for producing the glass material of the present invention is not particularly limited as long as the effect of the present invention is attained. For example, the glass material of the present invention can be produced by sealing predetermined amounts of raw materials of components in a silica glass ampoule, and vitrifying the content by heat treatment.

Examples of raw materials of the glass material of the present invention include simple substances such as Ge, Ga, S, Rb, Cs, $Cl_2$, $Br_2$, and $I_2$; chalcogenides, such as $GeS_2$, $Ga_2S_3$, BaS, $Cs_2S$, and $Rb_2S$; halides, such as $GeX_4$, $GaX_3$, $BaX_2$, CsX, RbX (X=Cl, Br, or I); or hydrate-containing halides in which water is contained in the halides listed above. These raw materials can be used in any combination of two or more.

The time for heat treatment is not particularly limited as long as the content is sufficiently vitrified. Specifically, it is preferably about 12 to 48 hours, and more preferably about 24 to 36 hours. In the vitrification process, it is preferable to heat the material by changing the temperature increase rate in stages or to keep the heated temperature for a certain period of time.

When the above production method is used, it is preferable that the inside of the silica glass ampoule used be sufficiently dried by a vacuum dryer.

The glass material of the present invention has high mold formability. In mold forming, the glass material is heated to a temperature around the softening point, and, for example, the glass is heat-pressed between an upper die and a lower die to thereby form the glass material into a desired shape.

The heating temperature necessary for such forming is not particularly limited, but is preferably a temperature about 10 to 70° C. higher than the yield point, and more preferably a temperature about 20 to 50° C. higher than the yield point.

Optical elements to be produced by mold forming are not particularly limited. Examples include spherical lenses, aspheric lenses, lens arrays, microlens arrays, diffraction gratings, and the like for which infrared transmission properties are required. These are useful as optical elements used for various sensors using infrared rays.

In an infrared sensor lens produced using the glass material of the present invention, it was confirmed that the sensitivity of the lens was increased by 20% or more, compared with a conventional typical example of Ge—Sb—Sn—S glass or a conventional typical example of Ga—Sb—Sn—S glass.

EXAMPLES

The present invention is described in detail below with reference to Examples. However, of course, the present invention is not limited to the Examples.

A silica glass ampoule was prepared, and the inside of the ampoule was washed with purified water. Then, using a rotary vacuum pump, the silica glass ampoule was heated with a burner under vacuum to evaporate moisture. Next, raw materials of the components were mixed according to each composition shown in Tables 1 and 2 below, and the mixture was put in the silica glass ampoule. After the inside of the ampoule was sufficiently vacuumized using a rotary vacuum pump, the ampoule was sealed using an $H_2$—$O_2$ burner.

The sealed silica glass ampoule was heated from room temperature to 150° C. at a heating rate of 87° C./hour, and from 150° C. to 450° C. at a heating rate of 100° C./hour, and then kept at 450° C. for 6 hours. Thereafter, the ampoule was heated from 450° C. to 980° C. at a heating rate of 87° C./hour, and then kept at the same temperature for 8 hours. Then, the silica glass ampoule was naturally cooled to room temperature so that the content was vitrified.

The Tg and Tc of the vitrified glass were measured using DSC. The transmitting properties of the vitrified glass from 200 nm to 2000 nm (2 μm) were measured with a visible spectrophotometer (U4100: produced by Hitachi Ltd.) and those from 2 μm to 20 μm were measured with a Fourier transform infrared spectrometer (FT-IR Spetoram 100: produced by Perkin Elmer).

Tables 1 and 2 indicate that, in Examples 1 to 8 and Comparative Examples 1 to 6, vitrified glass is marked with 0 and non-vitrified glass is marked with X.

The meanings of 1) to 3) in Tables 1 and 2 are as follows.
1) ΔT=crystallization temperature (Tc)−glass transition temperature (Tg)
2) wavelength in which the transmittance on the short wavelength side is 50%: Value of the wavelength in which transmittance on the short wave length side is 50% at 2 mm.
3) wavelength in which the transmittance on the long wavelength side is 50%: Value of the wavelength in which transmittance on the long wave length side is 50% at 2 mm.

TABLE 1

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Ge | 21.2 | 24.3 | 24.3 | 19.5 | 27.1 | 12.0 | 5.0 | | | 21.2 |
| Ga | 12.4 | 9.0 | 8.8 | 12.4 | 3.4 | 22.2 | | 10.5 | 12.5 | 12.4 |
| S | 61.1 | 61.7 | 61.7 | 57.5 | 59.3 | 55.0 | 60.0 | 58.3 | 50.0 | 61.1 |
| Ba | 1.8 | 1.6 | 1.7 | 3.5 | 3.4 | 3.7 | | | | 1.8 |
| Cl | | | | | | 7.0 | | | | 3.5 |
| Br | 3.5 | 3.4 | | | 6.8 | | | | | |
| I | | | 3.5 | 7.1 | | | | | 8.3 | |
| Sb | | | | | | | 30.0 | 22.9 | 20.9 | |
| Sn | | | | | | | 5.0 | 8.3 | | |
| Cs | | | | | | | | | 8.3 | |
| Glass formation | ○ | ○ | ○ | ○ | X | X | ○ | ○ | ○ | ○ |
| Glass transition temperature Tg (° C.) | 391.6 | 397.8 | 405.6 | 385.9 | — | — | 235.9 | 250.9 | 228 | 399.2 |
| Crystallization temperature Tc (° C.) | 532.7 | 550.5 | — | — | — | — | 304.6 | 362.8 | 384.9 | 538.9 |
| ΔT (K)[1] | 141.1 | 152.7 | 180< | 200< | — | — | 68.7 | 111.9 | 156.9 | 139.7 |
| Wavelength in which the transmittance on the short wavelength side is 50% (nm)[2] | 482.5 | 499.3 | 496.2 | 496.9 | — | — | 900.0 | 900.0 | 633.6 | 492.8 |
| Wavelength in which the transmittance on the long wavelength side is 50% (μm)[3] | 11.0 | 10.9 | 11.0 | 11.2 | — | — | 11.0 | 12.0 | 12.4 | 11.0 |

TABLE 2

| | Ex. 5 | Ex. 6 | Ex. 7 | Ex. 8 |
|---|---|---|---|---|
| Ge | 15.3 | 19.7 | 19.8 | 15.1 |
| Ga | 15.3 | 12.5 | 12.6 | 15.1 |
| S | 53.4 | 58.1 | 58.6 | 52.8 |
| Ba | 0.8 | 2.5 | 1.8 | 1.9 |
| Cl | 8.3 | 6.1 | — | — |
| Br | — | — | 5.4 | 0.4 |
| I | — | — | — | 9.0 |
| Sb | — | — | — | — |
| Sn | — | — | — | — |
| Cs | 6.9 | 1.0 | 1.8 | 5.0 |
| Rb | — | 0.1 | — | 0.7 |
| Glass formation | ○ | ○ | ○ | ○ |
| Glass transition temperature Tg (° C.) | 336.4 | 375.4 | 378.9 | 336.5 |
| Crystallization temperature Tc (° C.)) | 478.8 | 523.8 | 550.2 | 512.8 |
| $\Delta T(K)^{1)}$ | 142.4 | 148.4 | 171.3 | 176.3 |
| Wavelength in which the transmittance on the short wavelength side is 50% (nm) [2] | 462.4 | 480.4 | 473.0 | 476.8 |
| Wavelength in which the transmittance on the long wavelength side is 50% (μm) [3] | 11.0 | 11.0 | 11.0 | 10.9 |

FIG. 1 shows the transmission spectra of the glass samples obtained in Example 4 (Ge: 19.5%, Ga: 12.4%, S: 57.5%, Ba: 3.5%, and I: 7.1% in terms of molar concentration), Comparative Example 5 (Ga: 12.5%, S: 50.0%, I: 8.3%, Sb: 20.9%, and Cs: 8.3% in terms of molar concentration), and Comparative Example 6 (Ge: 21.2%, Ga: 12.4%, S: 61.1%, Ba: 1.8%, and Cl: 3.5% in terms of molar concentration) in the visible region and the infrared region of the glass samples.

As is clear from the results of FIG. 1 and Table 1, the "wavelength in which the transmittance on the short wavelength side is 50%" of the glass sample of Example 4 was shifted to the shorter wavelength side, as compared with the glass sample of Comparative Example 5. This indicates that the glass sample of Example 4 sufficiently allows rays in the visible region to pass through. It was also revealed that the glass material of Example 4 showed a high transmittance tendency in the visible region, as compared to the glass samples of Comparative Examples 5 and 6.

Figure 2:
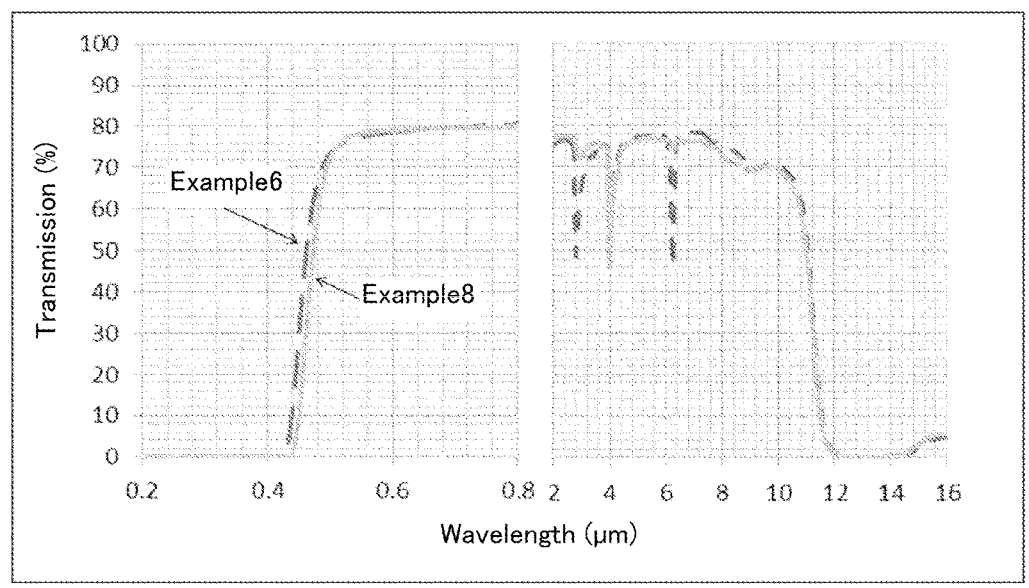
FIG. 2 shows the transmission spectra of Example 6 (dashed line) and Example 8 (solid line).

FIG. 2 shows the transmission spectra of the glass samples obtained in Example 6 (Ge: 19.7%, Ga: 12.5%, S: 58.1%, Ba: 2.5%, Cl: 6.1%, Cs: 1.0%, and Rb: 0.1% in terms of molar concentration) and Example 8 (Ge: 15.1%, Ga: 15.1%, S: 52.8%, Ba: 1.9%, Br: 0.4%, I: 9.0%, Cs: 8.3%, and Rb: 0.7% in terms of molar concentration) in the visible region and the infrared region of the glass samples.

The "wavelength in which the transmittance on the short wavelength side is 50%" of the glass materials of Examples 5 to 8, each comprising Cs and/or Rb, was shifted to the shorter wavelength side, as compared to the glass materials of Examples 1 to 4, each not comprising Cs and/or Rb. It is also revealed that the glass materials of Examples 6 and 8 showed, as in Example 4, a high transmittance tendency in the visible region, as compared to the glass materials of Comparative Examples 5 and 6.

Production of Aspheric Lens

The glass material of Example 4, whose yield point is 400° C., was mold-formed at 450° C. in a nitrogen atmosphere to produce an aspheric lens. As a result, an excellent aspheric lens was produced. Excellent aspheric lenses can be similarly produced when the glass materials obtained in other examples are used.

The invention claimed is:

1. A glass material allowing rays having a wavelength in the region from visible light to far-infrared light to pass through,
    the glass material consisting of, in terms of molar concentration:
    50 to 70% of S,
    15 to 30% of Ge,
    5 to 20% of Ga,
    0.5 to 15% of Ba,
    3 to 15% of at least one member selected from the group consisting of Cl, Br, and I, and more than 0% to 15% or less of Rb and/or Cs,
    with the proviso that when the Cl is present alone, its molar concentration is 6 to 15%.

2. The glass material according to claim 1, wherein the rays have a wavelength in the range of 420 nm to 12 μm.

3. The glass material according to claim 1, wherein the glass transition temperature (Tg) is 320° C. or more.

4. The glass material according to claim 1, wherein the difference (ΔT value) between the crystallization temperature (Tc) and the glass transition temperature (Tg) is 120 K or more.

5. The glass material according to claim 1 for use in producing a spherical lens, an aspheric lens, a lens array, a microlens array, or a diffraction grating by mold forming.

* * * * *